United States Patent [19]

Gast et al.

[11] Patent Number: 4,488,439
[45] Date of Patent: Dec. 18, 1984

[54] MASS FLOW METER WITH VIBRATION SENSOR

[75] Inventors: Theodor Gast, Berlin; Kurt Binder, Stuttgart; Günter Hönig, Ditzingen, all of Fed. Rep. of Germany

[73] Assignee: Robert Bosch GmbH, Stuttgart, Fed. Rep. of Germany

[21] Appl. No.: 405,725

[22] Filed: Aug. 6, 1982

[30] Foreign Application Priority Data

Aug. 8, 1981 [DE] Fed. Rep. of Germany ....... 3131561
Sep. 4, 1981 [DE] Fed. Rep. of Germany ....... 3134985

[51] Int. Cl.³ .............................................. G01F 1/78
[52] U.S. Cl. .............................................. 73/861.18
[58] Field of Search ............ 73/861.18, 861.21, 861.37

[56] References Cited

U.S. PATENT DOCUMENTS

| | | | |
|---|---|---|---|
| 3,608,374 | 9/1971 | Miller | 73/32 A X |
| 3,710,614 | 1/1973 | Oppliger | 73/59 |
| 3,715,920 | 2/1973 | Groberman et al. | 73/861.18 |
| 4,158,959 | 6/1979 | Blair | 73/32 A X |

FOREIGN PATENT DOCUMENTS 832346  5/1981  U.S.S.R. ........................... 73/861.18

Primary Examiner—Charles A. Ruehl
Attorney, Agent, or Firm—Frishauf, Holtz, Goodman & Woodward

[57] ABSTRACT

The mass flow rate of a fluid, for example a gas or air, for example passing through a duct or the like, is determined by placing a vibrating element in the path or stream of air flow, and measuring the damping thereof due to the air flow; the damping can easily be measured, in accordance with the invention, by connecting the vibrating element in a circuit having a servo system including a controlled variable amplifier and a comparator, such as a proportional-integral (PI) controller (14) comparing the signal on the vibrating element with a reference establishing a vibrating amplitude and, in turn, controlling the amplification of the variable amplification amplifier (8) to maintain a constant amplitude of vibration, the control signal controlling the variable amplification amplifier being a measure of the damping, and hence of mass flow rate. To eliminate damping due to extraneous conditions, such as clamping of the mechanical vibrating elements, connection of electrodes and the like, an alternating current (10a) can be fed to the vibrating element, the alternating current having a frequency which is high with respect to the vibration frequency, and then being filtered out by a band-pass filter (17) tuned to the alternating current frequency, the level of the signal across the vibrating element being subtracted from the overall damping signal to thereby eliminate errors due to inherent damping of the mechanical system independent of fluid flow.

9 Claims, 4 Drawing Figures

MASS FLOW METER WITH VIBRATION SENSOR

The present invention relates to a mass flow meter, and more particularly to a mass flow meter suitable, for example, to determine the mass flow rate of a gas, such as air, in a tubular structure, for example the induction pipe of an internal combustion engine.

BACKGROUND

It has previously been proposed to determine the mass flow rate of a fluid medium, typically air, by placing an impediment in the stream of the fluid, and vibrating the impediment. The impediment may, for example, be a plate or the like located transversely with respect to the direction of flow of the fluid. This plate is vibrated by a vibratory element, which may be a piezoelectric transducer, an induction coil, or the like. The vibrations of the plate are damped due to the pressure of the fluid medium thereagainst. Damping of the vibration can be sensed and will be a measure of the mass flow rate of the fluid.

Mass flow measuring elements based on this construction, as well as evaluation circuits for use therewith, are known—see, for example, German Patent Disclosure Document DE-OS No. 29 28 568. As described therein, the vibratory element is controlled by impulse width modulation, which requires substantial circuitry. This increases the cost of the mass flow meter, and permits its use only in very restricted and special situation, where the advantages of the sensitivity thereof outweight the costs. In accordance with this publication, an impediment is located within a tubular duct in which the medium flows, the impediment causing backing-up or damming of the fluid. The impediment, typically a plate, is vibrated by a piezoelectric drive. The interaction of the vibration of the plate with the fluid flowing in the duct causes damping of the body which is proportional to the mass-flow rate, that is, to the mass flow per unit time. Digital or analog output of the mass flow can be obtained.

THE INVENTION

It is an object to simplify the known structure and provide a system in which damping of the vibrating or oscillatory element can be easily measured, utilizing well known and simple circuit elements.

Briefly, a controlled variable amplification amplifier is connected in an oscillatory circuit which causes oscillations of a vibratory element, positioned or shaped to form a flow impediment. A control circuit controls the amplification of the amplifier, and hence the oscillatory energy supplied to the vibratory element to be maintained at a constant level, typically at a fixed vibration amplitude which may approach essentially undamped vibration. Measuring the amplification factor of the amplifier or, simply, the control signal which controls this amplification factor, then provides an output which will be representative of the mass flow, since the signal will be representative of that level which is required to maintain the oscillatory unit in predetermined oscillation state.

The system has the advantage that the oscillatory impediment can be easily energized for oscillation, and damping of the oscillations thereof due to flow of the fluid medium can be easily determined.

In accordance with a preferred feature of the invention, the actual value of oscillatory amplitude is sensed and a rectified signal is obtained representative thereof. This permits maintenance of the oscillatory amplitude constant in a simple manner by comparing this value with a reference, and controlling a variable amplifier in accordance with an error or deviation signal obtained by the comparison.

In accordance with a feature of the invention, the impediment to flow is arranged to change the inductivity of an excited coil. This permits elimination of disturbance signals and disturbance pulses on the control system. Changes in frequency due to changes in inductance can readily be evaluated by a frequency discriminator network.

Vibratory elements are always damped to some extent by the mechanical structure supporting the vibrator. The base damping, due to the holding structure, can readily be determined by feeding into the vibrating element an alternating voltage which differs from the vibration frequency, rectifying the voltage and sensing the amplitude thereof; the rectified alternating voltage will provide a signal, the amplitude of which will be a measure of the basic damping of the system due to the support or mechanical holding structure thereof, and can be subtracted from the signal which is obtained from the vibratory element at its vibration frequency. Upon such subtraction, then, only the signal due to mass flow of the fluid medium will be left, so that the output will be truly responsive to, and representative of, the mass flow of the fluid medium.

In accordance with a preferred feature of the feature, band filters are used which filter the oscillatory frequency of the oscillating element and further frequencies which occur in the system, for example the superimposed alternating voltage. The use of band filters also prevents oscillation of the oscillatory system, at random, with respect to harmonics of the base frequency; additionally, the oscillatory frequency and the additional frequency can be readily separated from each other and the signals obtained processed separately.

Desirably, the frequency of the alternating current signal is selected to be a high multiple of the oscillating frequency of the oscillatory system. This readily permits separation of the signals, and also permits reducing the size of the components of the band filters to be used therein.

DRAWINGS

Figure 1:
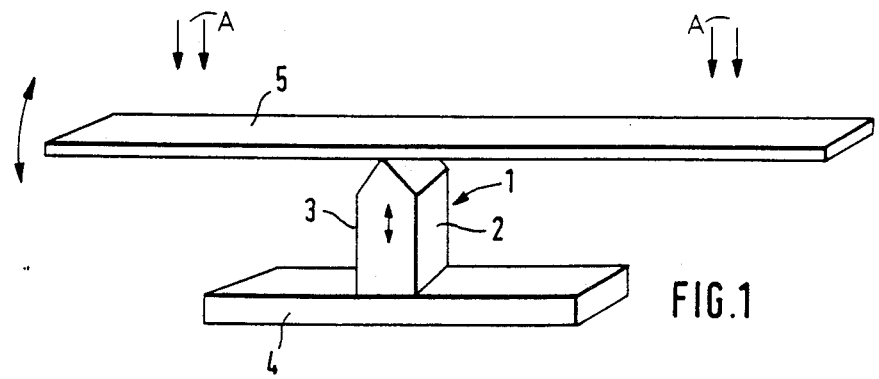
FIG. 1 is a schematic pictorial representation of a mass flow meter to sense air flow, showing the general principle, and using a piezo-ceramic transducer as the oscillating element.

The basic structure of a mass flow meter operating in the resonance mode is shown in FIG. 1. A piezo element 1 has electrodes 2, 3 placed thereon which are connected to an oscillatory circuit. A flow impediment oscillating plate 5 is placed in the stream of fluid flow, for example air flow, symbolized by arrows A. A fixed support plate 4 supports the piezo element 1 which, typically, is a piezo-ceramic element. In operation, the density and flow rate of the fluid impinging on the oscillatory element 5 more or less dampens the oscillations thereof.

Figure 2:
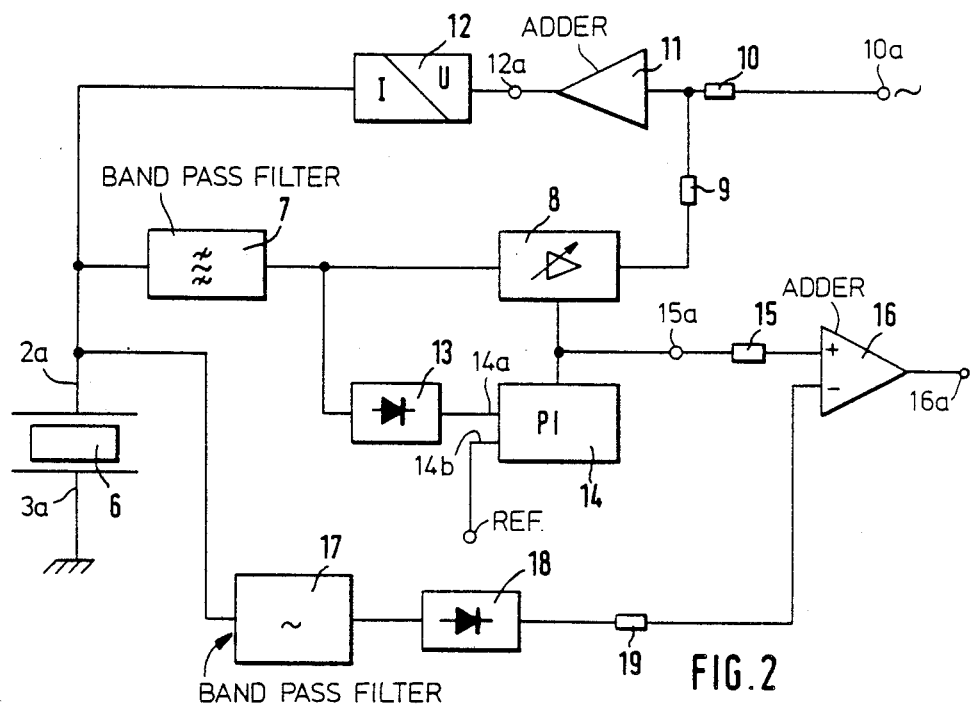
FIG. 2 is an evaluation circuit for use with the system of FIG. 1.

FIG. 2 shows one embodiment of the evaluation circuit to operate the unit as a mass flow meter. In FIG. 2, the entire system is shown symbolically by the unit 6. The electrodes 2, 3 of the piezo-ceramic element 1 are connected to lines 2a, 3a, respectively. Line 3a is connected to ground or chassis. Line 2a, connected to electrode 2, is connected to a band filter 7 which is so arranged, that is, has such a filtering range that its pass rate is within the resonance range of the oscillatory element 5 (FIG. 1). The output of the band filter 7 is connected to a controlled amplifier 8 which, in turn, has its output connected through a resistor 9 to an adding circuit 11. Adder circuit 11 receives an a-c voltage signal over a second adder resistor 10. The a-c voltage is coupled in from a terminal 10a. The output of adder 11 is connected to a voltage-current transformer 12 which is connected over line 2a of the electrode 2 of the piezo-ceramic element 1 of the system 6.

The output of the band-pass filter 7 is further connected to a rectifier 13 which, in turn, is connected to the "actual signal" input 14a of a proportional-integral (PI) controller 14. The command input 14b of the PI controller 14 is connected to a reference voltage which permits control of the amplitude of oscillation of the oscillatory system. The output of the PI controller 14 is connected over a resistor 15 to the positive input of an algebraic adder 16.

The electrode 2, connected to line 2a of the piezo-ceramic element 1, is connected to a second band-pass filter 17. Band-pass filter 17 has a pass frequency which is in the range of the frequency of the a-c voltage coupled in by terminal 10a and supplied to the adder 11 through resistor 10. The output of the band-pass filter 17 is rectified in a rectifier 18, and coupled by resistor 19 with the negative or inverting input of the algebraic adder 16 so that, in effect, the output from rectifier 18 is subtracted from the output of controller 14 supplied by resistor 15. The terminal 16a, connected to the output of the adder 16, supplies the measured signal.

Operation: The system of FIG. 1 is placed in a fluid stream A, for example confined within a pipe or tube, the mass flow rate of which is to be measured by damping of the vibratory system 1–5, and generally represented at 6 in FIG. 2. Electrical energy is supplied to the piezo-ceramic element 1 by the electrodes 2, 3. The oscillating plate or bar or rod 5 has an inherent frequency based on its geometric dimensions, materials, and the like. Vibration of the element 5 is damped by the fluid passing over and around the element 5. Additional damping occurs due to coupling losses, and the physical structure of the electrodes 2, 3, losses within the piezo-ceramic body 1, and energy losses which may result due to non-symmetrical mechanical support or clamping of the piezo-ceramic body on the support 4.

The mechanical oscillating system is excited by the excitation circuit including the amplifier 8 and the voltage-current transformer 12 at its inherent resonant oscillating frequency. The electrical band-pass filter 7 permits only a predetermined oscillating mode. Amplifier 8 has a variable amplification factor. The amplification factor of the amplifier 8 is so controlled by the reference voltage applied to terminal 14b to the PI controller 14 that the amplitude thereof will have a predetermined command value. A command value representative thereof is applied as a voltage to the reference terminal connected to terminal 14b of the PI controller 14. The actual value of vibration is obtained after rectification in rectifier 13. The a-c voltage occurring at the band-pass filter 7 will be representative of the oscillating amplitude of the oscillatory systems 6. The amplification of the amplifier 8 must be set to retain the system in self-oscillation. When this is the case, the overall damping of the system is compensated. The signal derived from the PI controller 14, which controls the amplification of the amplifier 8, thus corresponds to the overall damping of the oscillatory system and is applied through resistor 15 to the adder 16. Preferably, the adder 16 is an adding amplifier.

If the damping factor, for example due to the electrodes, and other factors independent of the fluid flow A, is small, the output will be representative of fluid flow. This output will, however, only be approximate since the extraneous damping of the system, for example due to the support 4, coupling of the electrodes 2, and other factors referred to above, has been neglected.

At very small mass flow rates it is not suitable to neglect the damping effects due to mechanical clamping of the system, electrical coupling, placement of the electrodes, and the like. To determine this basic damping, the additional alternating voltage is connected by terminal 10a to the system. Preferably, the frequency of this voltage is substantially higher than the inherent or resonant frequency of the oscillatory system, so that, as far as the frequency of the voltage coupled in at terminal 10a is concerned, the oscillatory system 6 acts like a mechanically rigid body. The additional frequency must not be the same as the resonant frequency of the piezo-ceramic element since, then, damping of the additionally fed-in alternating voltage is too small.

The damped signal representative of the additionally supplied alternating voltage is filtered by means of the band-pass filter 17 and rectified in rectifier 18. A band-pass filter provides the best possibility to select and separate the frequencies occurring on the oscillatory system 6. If the difference in frequency between the resonant frequency of the oscillatory system 6 and the additionally supplied frequency at terminal 10a is very substantial, however, band-pass filters are not absolutely necessary.

The signal available at the output of rectifier 18 will be representative of damping which is caused additionally by the clamping or mechanical holding of the piezo-electric structure 1, as well as damping effects due to coupling or the like. In order to obtain the precise damping of the oscillatory system caused only by fluid flow, the voltage available at rectifier 18 is subtracted from the voltage which represents the overall damping. This subtraction is carried out in the algebraic adder, by supplying the rectified voltage from rectifier 18 over coupling resistor 19 to a subtracting input in the adder 16. The output from the adder 16 at terminal 16a thus will provide a signal, for example a signal voltage, which is proportional only to the damping of the oscillatory system due to the mass flow of the fluid, typically air, as represented by arrows A, FIG. 1.

Figure 3:
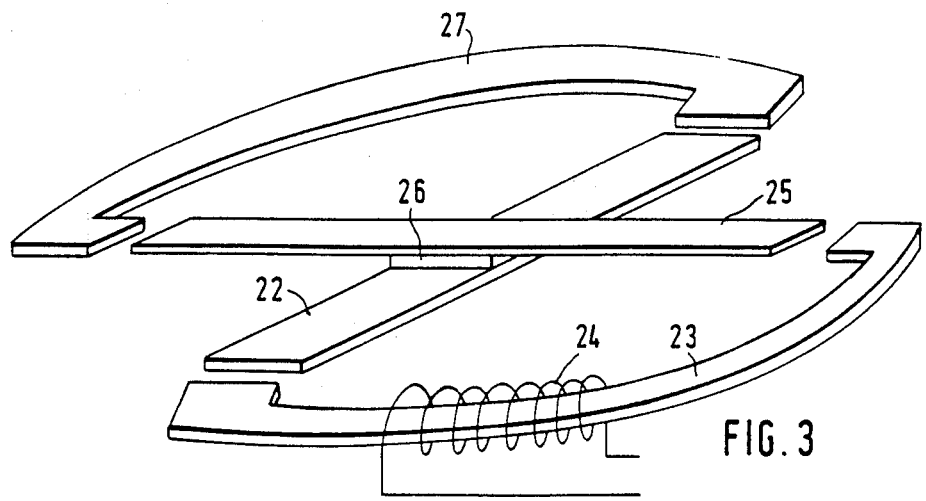
FIG. 3 illustrates an electromagnetically excited resonance oscillator.

The oscillatory element need not be a piezo-electric element; oscillatory energy can be supplied also in different manner. FIG. 3 illustrates a mass fluid flow, typically mass air flow sensor operating on the resonant oscillation principle, in which energy is magnetically supplied.

Two oscillatory elements 22, 25 are joined by a non-magnetic junction or holder 26 at their center position. This center position also provides for attachment to a housing (not shown) of elements 22, 25, for example by a holder bracket secured to the inside wall of a pipe. A flux return element in form of a sheet-metal strip 27 extends from one end of the oscillatory element 25 to the other end of the oscillatory element 22. A second flux return sheet-metal strip 23 extends from one end of the oscillatory element 22 to the other end of the oscillatory element or strip 25, thus forming a completely closed magnetic circuit. An exciter coil 24 is wound on the flux return strip 23. The air gaps between the oscillatory elements 22, 25 and the respective flux return strips 23, 27 are much smaller than the distance defined by the holder 26 between the oscillatory elements 22, 25.

The mechanical oscillatory system has a resonant frequency which is determined by its geometric dimensions. Reliable oscillations of the system is insured by slightly offsetting the oscillatory strips or bars or plates 22, 25 with respect to the return strips 23, 27.

The oscillatory system of FIG. 3 is damped in accordance with mass fluid flow. At small mass flow rates, the inherent damping due to the mechanical holding structure, and the characteristics of the materials themselves, may not be neglected, however.

The circuit of FIG. 2 can be used in the system of FIG. 3, in which the entire unit of FIG. 3 is represented by element 6, and coil 24 would be connected to connections 2a, 3a.

Figure 4:
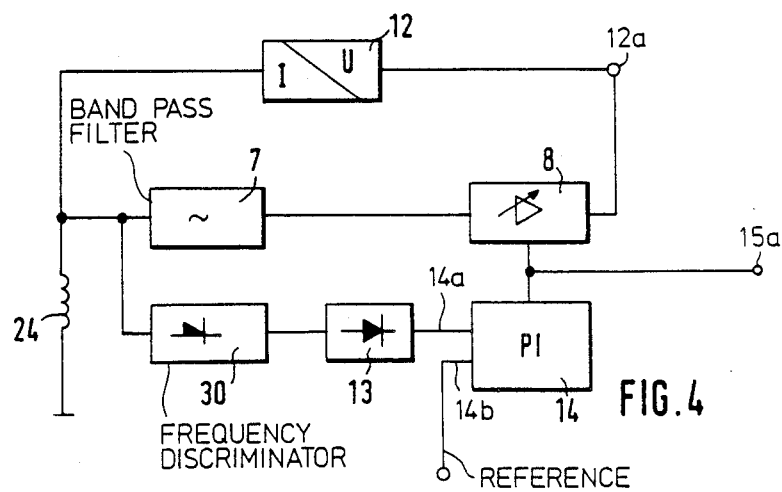
FIG. 4 is a schematic diagram of another embodiment of an evaluation circuit.

The system of FIG. 3 may be used with a different circuit, and FIG. 4 shows a preferred circuit for use with the oscillatory system of FIG. 3.

The exciter coil 24 is connected to the band-pass filter 7—as in FIG. 2—which, in turn, is connected to a similar controlled amplifier 8, the output of which is connected to a voltage-current transformer or transfer circuit 12. The output of the circuit 12 is connected to coil 24.

In accordance with the embodiment of FIG. 4, a frequency discriminator 30 is additionally connected to the coil 24, the output of which is connected to rectifier 13 which has its output connected to terminal 14a of PI controller 14. The reference input connected to terminal 14b is connected to a d-c voltage which determines or sets or commands the amplitude of the oscillatory system. The feedback and amplification factor of the amplifier 8 causes the oscillatory system to oscillate at its inherent frequency based on its mechanical resonant frequency.

The coil 24 has a certain inductivity which, together with the capacity values inherent in the circuits connected thereto, form an electrical resonant inherent frequency. The inductivity of the coil, however, does not remain invarying; rather, it depends, is a function of, the position of the oscillatory elements 22, 25. In other words, the inductance of the coil 24 depends on the instantaneous position of the oscillatory elements 22, 25. Thus, the electrical resonant frequency of the system changes constantly in dependence on the position of the vibratory elements 22, 25. This electrical resonant frequency signal is applied to a frequency discriminator 30 the output of which provides an output voltage, the frequency of which is related to the frequency of the oscillatory system. The amplitude of this voltage is a measure of the damping of the oscillatory system. This output voltage is rectified in rectifier 13 and is supplied as the actual voltage to the PI controller 14. The output signal of the PI controller 14 which, in turn, controls the amplification of the amplifier 18, is, then, a measure for the overall damping of the system.

The frequency discriminator 30 permits obtaining the amplitude signals particularly free from disturbances.

The electrical resonant frequency is determined by coil inductance and, in accordance with a preferred feature of the invention, should be higher than the mechanical resonant frequency of the system.

If it is desired to exclude errors introduced by mechanical damping of the system due to structural supports, and the like, the additional circuit described in connection with FIG. 4, including introduction of an a-c voltage at terminal 10a, and subtraction of the resulting signal from the output at output terminal 15a of FIG. 4 may be used. Rather than connecting the output from controlled amplifier 8 directly to terminal 12a (FIG. 4), and hence to the voltage-current transformation network 12, the output from amplifier 8 is to be connected as shown in FIG. 2, in which the adder 11, adding the a-c voltage 10a in addition to the output from amplifier 8, is connected to terminal 12a.

Various changes and modifications may be made, and features described in connection with any one of the embodiments may be used with any of the others, within the scope of the inventive concept.

In one exemplary embodiment, the piezoelectric ceramic 1 was barium titanate and had an electrical, resonant frequency of 100 kHz. The mechanical structure of vibratory element 5, and piezoelectric structure 1, 2, 4, had a resonant frequency of 3 kHz. Band-pass filter 7, connected in FIG. 2, had a band-pass range of 1 kHz. Band-pass filter 17 had a band-pass range of 40 kHz–60 kHz. Frequency supplied at terminal 10: 50 kHz.

In the embodiment of FIGS. 3 and 4, the strips 22, 25 were strips of metallic glasses, having a dimension of 10 mm; joined by a block mad of ceramic of 4 mm thickness; the coil 24 was 200 turns of copper wire, and the resonant frequency of the system 22–27 was 10 kHz, the band-pass filter 7 had a band-pass range of 9 kHz–11 kHz, the frequency discriminator 30 a band width of 2 kHz.

We claim:

1. Mass flow meter, particularly to determine gas or air flow having a vibratory system including
   a mechanical vibratory element and
   an oscillator circuit coupled to said element and inducing vibrations therein,
   and comprising
   a controlled variable amplification amplifier connected in the oscillator circuit;
   a control circuit controlling the amplification of the amplifier, and hence the oscillatory energy supplied to the vibratory element to maintain constant amplitude vibrations of the vibratory element under conditions of variable damping thereof upon change in mass flow impinging on the vibratory element,
   means coupled to said control circuit for generating an output damping signal representative of the oscillatory energy supplied to the vibrating element to maintain the amplitude of the vibrations constant;
   the amplification of the amplifier, as controlled by said control circuit being representative of the rate of said fluid mass flow; and
   means for generating a signal representative of damping of the vibratory element independently of fluid flow, including
   a source of alternating current having a frequency different from the frequency of oscillation of the oscillator circuit, and connected to the oscillator circuit to apply said alternating current to the mechanical vibratory element;

means for separating said flow independent damping signal from a signal generated by said oscillator circuit;

and means for subtracting the flow independent damping signal from said output damping signal to provide a flow meter output signal representative of mass flow of gas or air.

2. Meter according to claim 1, wherein the control circuit comprises a servo control circuit, and an oscillator circuit signal representative of oscillatory amplitude of the vibrating element is applied to the servo control circuit as an actual vibration amplitude value, said servo control circuit having a command or reference value applied thereto, comparing the actual vibration amplitude value with the command or reference value, and generating a control signal, said control signal being applied as an amplification control signal to said amplifier and the magnitude of said control signal being a measure of the damping effects of the fluid mass flow, said control signal also determining said output damping signal.

3. Meter according to claim 2, including a rectifier rectifying the signal derived from the oscillator circuit for connection to said servo control circuit as a d-c signal representative of actual oscillatory amplitude.

4. Meter according to claim 1, wherein the oscillator circuit includes an inductive exciter coil, the inductance of said exciter coil changing in dependence on loading of the mechanical vibratory element as a result of fluid flow impinging thereon;

and means connected to the control circuit for deriving a signal representative of the change of inductance of said exciter coil.

5. Meter according to claim 4, wherein said signal deriving means comprises a frequency discriminator.

6. Meter according to claim 1, wherein said separating means comprises a band-pass filter tuned to pass essentially only the frequency of the alternating current source.

7. Meter according to claim 6, further including a band-pass filter in the oscillator circuit to pass essentially only the frequencies of oscillations or vibrations of the vibratory element.

8. Meter according to claim 6, wherein the frequency of the source of alternating current is substantially higher than the oscillating or vibrating frequency of the vibratory element.

9. Meter according to claim 1, further including a band-pass filter in the oscillator circuit to pass essentially only the frequencies of oscillations or vibrations of the vibratory element.

* * * * *